United States Patent
Zhang

(10) Patent No.: US 11,140,682 B2
(45) Date of Patent: Oct. 5, 2021

(54) METHOD AND DEVICE IN UE AND BASE STATION FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/858,764

(22) Filed: Apr. 27, 2020

(65) Prior Publication Data
US 2020/0275447 A1   Aug. 27, 2020

Related U.S. Application Data

(63) Continuation of application No. PCT/CN2017/110286, filed on Nov. 9, 2017.

(51) Int. Cl.
*H04W 72/04* (2009.01)
*H04W 72/12* (2009.01)

(52) U.S. Cl.
CPC ....... *H04W 72/0453* (2013.01); *H04W 72/12* (2013.01)

(58) Field of Classification Search
CPC .................. H04W 72/12; H04W 72/0453
See application file for complete search history.

(56) References Cited

U.S. PATENT DOCUMENTS

2016/0269160 A1   9/2016   Noh et al.

FOREIGN PATENT DOCUMENTS

| CN | 101155012 A | 4/2008 |
| CN | 101815248 A | 8/2010 |
| CN | 105228248 A | 1/2016 |

*Primary Examiner* — Angel T Brockman

(57) ABSTRACT

The disclosure provides a method and a device in a User Equipment (UE) and a base station for wireless communication. The UE transmits K pieces of first-type information through an air interface, wherein the K pieces of first-type information indicate multi-antenna related capabilities of the UE under K transmission configurations respectively; the K transmission configurations all correspond to a first frequency band combination, and the first frequency band combination comprises one or more frequency bands; numbers of parallel carriers corresponding to the K transmission configurations belong to K first-type integer sets respectively, any one of the K first-type integer sets is composed of one or more positive integers, and any two of the K first-type integer sets are different. The above method can improve the peak rate of the UE and improve the efficiency of transmission.

20 Claims, 11 Drawing Sheets

METHOD AND DEVICE IN UE AND BASE STATION FOR WIRELESS COMMUNICATION

CROSS REFERENCE TO RELATED APPLICATIONS

This application is a continuation of International Application No. PCT/CN2017/110286, filed on Nov. 9, 2017, claiming the priority benefit of International Application PCT/CN2017/110286, filed on Nov. 9, 2017, the full disclosure of which is incorporated herein by reference.

BACKGROUND

Technical Field

The disclosure relates to transmission methods and devices for radio signals in wireless communication systems, and in particular to a transmission method and device for radio signals in a wireless communication system supporting multi-antenna technologies.

Related Art

In conventional 3rd Generation (3G) communication and Long Term Evolution (LTE) systems, multi-antenna transmission is an important technology. In New Radio (NR) systems, multi-antenna technologies represented by massive MIMO are introduced.

In LTE, a User Equipment (UE) is capable of indicating an MIMO capability for each one of multiple carriers in a carrier aggregation separately.

Compared with existing multi-antenna technologies in 3G and LTE, massive MIMO may bring new hardware structures for the UE or base station, for example, the UE side may be equipped with more panels.

SUMMARY

A system bandwidth in next-generation mobile communication systems may exceed a bandwidth supported by a single Radio Frequency (RF) chain of a UE. Further, for massive MIMO, the UE may be equipped with multiple panels or can form multiple analog beams.

The inventor finds through researches that a UE can employ multiple equipped panels to receive or transmit radio signals parallelly in multiple frequency-domain resources respectively; the inventor finds through further researches that the MIMO capability reported by the UE may be related to a number of frequency-domain resources operating parallelly of the UE. In existing LTE, the reported MIMO capability is unrelated to a number of carriers operating parallelly of the UE; therefore, massive MIMO scenarios cannot be applied.

In view of the above problems, the disclosure provides a solution. It should be noted that the embodiments of the UE of the disclosure and the characteristics in the embodiments may be applied to the base station if no conflict is incurred, and vice versa. The embodiments of the disclosure and the characteristics in the embodiments may be mutually combined arbitrarily if no conflict is incurred.

It should be further noted that: although the disclosure is initially designed for massive MIMO, the disclosure is also applicable to conventional multi-antenna transmissions.

The disclosure provides a method in a UE for wireless communication, wherein the method includes:

transmitting K pieces of first-type information through an air interface, the K being a positive integer greater than 1.

Herein, the K pieces of first-type information indicate multi-antenna related capabilities of the UE under K transmission configurations respectively; the K transmission configurations all correspond to a first frequency band combination, and the first frequency band combination includes one or more frequency bands; numbers of parallel frequency subbands corresponding to the K transmission configurations belong to K first-type integer sets respectively, any one of the K first-type integer sets is composed of one or more positive integers, and any two of the K first-type integer sets are different.

In one embodiment, the above method can assign multiple RF chains of the UE to different frequency subbands to improve the peak rate of the UE; on the other hand, when the number of parallel frequency subbands of the UE is small, the above method enables as many as possible RF chains to be concentrated into one frequency subband, to improve the efficiency of transmission.

In one embodiment, a working bandwidth of a single RF chain of the UE can accommodate one of multiple parallel frequency subbands only.

In one embodiment, the multi-antenna related capability includes a number of layers.

In one embodiment, one layer is mapped to one or more antenna ports.

In one embodiment, the multi-antenna related capability includes a number of layers for downlink reception.

In one embodiment, the multi-antenna related capability includes a number of layers for uplink transmission.

In one embodiment, the multi-antenna related capability includes a number of antenna ports for uplink transmission.

In one embodiment, the multi-antenna related capability includes a number of panels.

In one embodiment, the multi-antenna related capability includes a number of panels for downlink reception.

In one embodiment, the multi-antenna related capability includes a number of panels for uplink transmission.

In one embodiment, the multi-antenna related capability includes a number of analog beams.

In one embodiment, the multi-antenna related capability includes a number of analog beams for downlink reception.

In one embodiment, the multi-antenna related capability includes a number of analog beams for uplink transmission.

In one embodiment, each of the K first-type integer sets is composed of one positive integer.

In one embodiment, at least two of the K first-type integer sets include different numbers of positive integers.

In one embodiment, one of the K first-type integer sets is 1.

In one embodiment, one of the K first-type integer sets is 2.

In one embodiment, one of the K first-type integer sets is composed of 3 or 4.

In one embodiment, one of the K first-type integer sets is composed of a positive integer greater than 1.

In one embodiment, the frequency subband is a continuous frequency domain resource not greater than a frequency band to which it belongs.

In one embodiment, the frequency subband is a carrier.

In one embodiment, the frequency subband is an active carrier.

In one embodiment, the frequency subband has one and only one serving cell for the UE.

In one embodiment, the frequency subband includes multiple Physical Resource Blocks (PRBs) in frequency domain, and the multiple PRBs are consecutive in frequency domain.

In one embodiment, the frequency subband is one Bandwidth Part (BWP).

In one embodiment, the parallel frequency subbands refer to: frequency subbands in which the UE can receive data simultaneously.

In one embodiment, the parallel frequency subbands refer to: frequency subbands in which the UE can transmit data simultaneously.

In one embodiment, the parallel frequency subbands refer to: active frequency subbands configured for the UE.

In one embodiment, the parallel frequency subbands refer to: aggregated active frequency subbands configured for the UE.

In one embodiment, all frequency subbands corresponding to any one of the K transmission configurations belong to the first frequency band combination.

In one embodiment, the phrase that two first-type integer sets are different refers that: at least one positive integer belongs to one of the two first-type integer sets and does not belong to the other one first-type integer set.

In one embodiment, there is no positive integer belonging to any two of the first-type integer sets simultaneously.

In one embodiment, supposing the K configurations correspond to K frequency subband sets respectively, any one of the K frequency subband sets belongs to the first frequency band combination, the K frequency subband sets are one-to-one corresponding to the K first-type integer sets, and a number of possible frequency subbands in any one of the K frequency subband sets forms a corresponding first-type integer set.

In one embodiment, the air interface is wireless.

In one embodiment, the air interface includes a wireless channel.

In one embodiment, the air interface is an interface between a base station and the UE In one embodiment, the air interface is a Uu interface.

In one embodiment, the air interface includes a Physical Uplink Shared Channel (PUSCH).

In one embodiment, the air interface includes an UpLink Shared Channel (UL-SCH).

Specifically, according to one aspect of the disclosure, the method includes:

receiving a first signaling through the air interface.

Herein, the first signaling is used for determining Q transmission modes, the Q being a positive integer greater than 1; the Q transmission modes are all applied to a first frequency subband set, the first frequency subband set is composed of L frequency subband(s), the L being a positive integer; numbers of parallel frequency subbands corresponding to the Q transmission modes are Q second-type integer sets respectively; any one of the Q second-type integer sets is composed of one or more positive integers, and any two of the Q second-type integer sets are different; and the K pieces of first-type information are used for determining the Q transmission modes.

In one embodiment, the Q is less than the K.

In the above embodiment, the base station selects the appropriate Q transmission modes for the UE according to the K pieces of first-type information and a number of possible scheduled parallel frequency subbands, thereby avoiding configuring K transmission modes and reducing signaling overhead.

In one embodiment, the first signaling is a higher layer signaling.

In one embodiment, the higher layer signaling is a Radio Resource Control (RRC) layer signaling.

In one embodiment, the higher layer signaling is a Media Access Control (MAC) layer signaling.

In one embodiment, the first signaling is configured semi-statically.

In one embodiment, the first signaling is a physical layer signaling.

In one embodiment, the first signaling is configured dynamically.

In one embodiment, the L is 1, and the frequency subband is a carrier.

In one embodiment, the first frequency subband set includes only frequency subband, and the frequency subband is a BWP.

In one embodiment, parallel frequency subbands corresponding to the Q transmission modes all belong to the first frequency subband set.

In one embodiment, all frequency subbands in the first frequency subband set belong to the first frequency band combination in frequency domain.

In one embodiment, the first signaling indicates explicitly the first frequency subband set, and the first signaling indicates explicitly the Q transmission modes in view of the first frequency subband set.

In one embodiment, the L is greater than 1, for each frequency subband in the first frequency subband set, the first signaling indicates explicitly the Q transmission modes.

In one embodiment, the Q second-type integer sets are one-to-one corresponding to Q first-type integer sets among the K first-type integer sets, and the Q second-type integer sets are subsets of corresponding first-type integer sets respectively.

In one embodiment, the Q transmission modes are one-to-one corresponding to multi-antenna related capabilities under Q transmission configurations among the K transmission configurations, and numbers of parallel frequency subbands corresponding to the Q transmission configurations belong to the Q first-type integer sets respectively.

In one embodiment, a number of layers included in any one of the Q transmission modes is a subset of a number of layers included in a corresponding multi-antenna related capability.

In one embodiment, a number of panels included in any one of the Q transmission modes is equal to a number of panels included in a corresponding multi-antenna related capability.

In one embodiment, a number of analog beams included in any one of the Q transmission modes is equal to a subset of a number of analog beams included in a corresponding multi-antenna related capability.

Specifically, according to one aspect of the disclosure, the method includes:

receiving a second signaling; and receiving L1 radio signal(s) in L1 frequency subband(s) respectively, or transmitting L1 radio signal(s) in L1 frequency subband(s) respectively.

Herein, the second signaling indicates L2 frequency subband(s), the L1 frequency subband(s) is(are) a subset of the L2 frequency subband(s), the L2 is a positive integer not less than the L1, the L2 belongs and only belongs to a target first-type integer set among the K first-type integer sets, the target first-type integer set corresponds to a target transmission configuration among the K transmission configurations, and the multi-antenna related capability under the target transmission configuration is used for determining a number of antenna ports transmitting each of the L1 radio signal(s).

In one embodiment, the L1 is equal to the L2, that is, L1 frequency subband(s) is(are) the L2 frequency subband(s).

In one embodiment, the second signaling is a physical layer signaling.

In the above embodiment, the base station is capable of dynamically configuring the number of parallel frequency subbands, to make full use of the RF chains of the UE as far as possible according to scheduling and improve the efficiency of transmission.

In one embodiment, the second signaling is a higher layer signaling.

In one subembodiment, the L1 is less than the L2, and the L1 does not belong to the target second-type integer set.

In the above embodiment, the base station semi-statically configures the number of parallel frequency subbands, to reduce the frequency of transmitting the second signaling, thereby reducing signaling overhead.

In one embodiment, the L2 frequency subband(s) is(are) one active carrier configured by the second signaling respectively.

In one embodiment, the L2 belongs and only belongs to a target second-type integer set among the Q second-type integer sets, the target second-type integer set is a subset of the target first-type integer set, the target second-type integer set corresponds to a target transmission mode among the Q transmission modes, and the target transmission mode is applied to the L1 radio signal(s).

Specifically, according to one aspect of the disclosure, the method includes:

receiving L1 scheduling signaling(s) through the air interface.

Herein, the L1 scheduling signaling(s) is(are) one-to-one corresponding to the L1 radio signal(s), and each of the L1 scheduling signaling(s) includes configuration information of a corresponding radio signal; and the multi-antenna related capability under the target transmission configuration is used for determining at least one of a payload size of each of the L1 scheduling signaling(s) or a format of each of the L1 scheduling signaling(s).

The above method can reduce air interface overheads occupied by the L1 scheduling signaling(s), and improve the efficiency of transmission.

In one embodiment, the second signaling is a physical layer signaling.

In one subembodiment, the L1 is equal to the L2, that is, L1 frequency subband(s) is(are) the L2 frequency subband(s).

In one embodiment, the second signaling is a higher layer signaling.

In one subembodiment, the L1 is less than the L2, and the L1 does not belong to the target second-type integer set.

In one embodiment, the L1 scheduling signaling(s) is(are) all physical layer signaling(s).

In one embodiment, the L1 scheduling signaling(s) is(are) one piece of Downlink Control Information (DCI) respectively.

In one embodiment, the L1 scheduling signaling(s) include(s) at least one higher layer signaling.

In one embodiment, the L1 scheduling signaling(s) is(are) one downlink grant DCI respectively, and the UE receives the L1 radio signal(s) in the L1 frequency subband(s) respectively.

In one subembodiment, the configuration information is used for determining a beam used for receiving a corresponding radio signal.

In one subembodiment, the configuration information is used for determining an analog beam used for receiving a corresponding radio signal.

In one subembodiment, the configuration information includes a Transmission Configuration Indicator (TCI).

In one subembodiment, an index of a downlink Reference Signal (RS) which is Quasi Co Located (QCLed) with a receiving beam of a corresponding radio signal is indicated.

In one embodiment, the downlink RS includes at least one of a Primary Synchronization Signal (PSS), a Secondary Synchronization Signal (SSS), or a Channel Status Information (CSI).

In one embodiment, the L1 scheduling signaling(s) is(are) one uplink grant DCI respectively, and the UE transmits the L1 radio signal(s) in the L1 frequency subband(s) respectively.

In one subembodiment, the configuration information is used for determining a beam used for transmitting a corresponding radio signal.

In one subembodiment, the configuration information is used for determining an analog beam used for transmitting a corresponding radio signal.

In one subembodiment, an index of a downlink RS which is QCLed with a transmitting beam of a corresponding radio signal is indicated.

In one subembodiment, an index of an uplink RS which is QCLed with a transmitting beam of a corresponding radio signal is indicated.

In one subembodiment, the uplink RS includes a Sounding Reference Signal (SRS).

In one subembodiment, the uplink RS includes an uplink DeModulation Reference Signal (DMRS).

In one subembodiment, the configuration information includes at least one of occupied time-frequency resources, a Modulation and Coding Status (MCS), a Redundancy Version (RV) or a New Data Indicator (NDI).

In one sub embodiment, the configuration information includes at least one of a DMRS, occupied Resource Elements (REs) or an RS sequence corresponding to DMRS.

In one embodiment, all the L1 frequency subband(s) belong(s) to the first frequency subband set, the L belongs and only belongs to a target second-type integer set among the Q second-type integer sets, the target second-type integer set is a subset of the target first-type integer set, the target second-type integer set corresponds to a target transmission mode among the Q transmission modes, and the target transmission mode is applied to the L1 radio signal(s).

In one subembodiment, the L1 is less than the L, and the L1 does not belong to the target second-type integer set.

In one subembodiment, the first signaling indicates the first frequency subband set.

In one embodiment, the L1 belongs and only belongs to a target second-type integer set among the Q second-type integer sets, the target second-type integer set is a subset of the target first-type integer set, the target second-type integer set corresponds to a target transmission mode among the Q transmission modes, and the target transmission mode is applied to the L1 radio signal(s).

In one embodiment, the format is a DCI format.

In one embodiment, an implication of a bit in at least one of the L1 scheduling signaling(s) is related to a corresponding format.

In one embodiment, each of the L1 scheduling signaling(s) includes multiple fields, and a number of fields included in at least one of the L1 scheduling signaling(s) is related to a corresponding format.

In one embodiment, each of the L1 scheduling signaling(s) includes multiple fields, and a number of bits included in at least one of the fields included in at least one of the L1 scheduling signaling(s) is related to a corresponding format.

In one embodiment, the payload size of one scheduling signaling refers to a number of useful bits.

In one embodiment, the bit corresponding to the payload size of one scheduling signaling does not include a padding bit.

In one embodiment, the bit corresponding to the payload size of one scheduling signaling does not include a frozen bit.

Specifically, according to one aspect of the disclosure, the multi-antenna related capability includes a number of layers.

In one embodiment, a number of layers supported by the multi-antenna related capability corresponding to one of the K transmission configurations is 1.

In one embodiment, a number of layers supported by the multi-antenna related capability corresponding to one of the K transmission configurations is 1, 2, 4, 8 or 16.

In one embodiment, a number of layers supported by the multi-antenna related capability corresponding to one of the K transmission configurations is 1, 2, 4 or 8.

The disclosure provides a method in a base station for wireless communication, wherein the method includes:

receiving K pieces of first-type information through an air interface, the K being a positive integer greater than 1.

Herein, the K pieces of first-type information indicate multi-antenna related capabilities of a transmitter of the K pieces of first-type information under K transmission configurations; the K transmission configurations all correspond to a first frequency band combination, and the first frequency band combination includes one or more frequency bands; numbers of parallel frequency subbands corresponding to the K transmission configurations belong to K first-type integer sets respectively, any one of the K first-type integer sets is composed of one or more positive integers, and any two of the K first-type integer sets are different.

Specifically, according to one aspect of the disclosure, the method includes:

transmitting a first signaling through the air interface.

Herein, the first signaling is used for determining Q transmission modes, the Q being a positive integer greater than 1; the Q transmission modes are all applied to a first frequency subband set, the first frequency subband set is composed of L frequency subband(s), the L being a positive integer; numbers of parallel frequency subbands corresponding to the Q transmission modes are Q second-type integer sets respectively; any one of the Q second-type integer sets is composed of one or more positive integers, and any two of the Q second-type integer sets are different; and the K pieces of first-type information are used for determining the Q transmission modes.

Specifically, according to one aspect of the disclosure, the method includes:

transmitting a second signaling; and transmitting L1 radio signal(s) in L1 frequency subband(s) respectively, or receiving L1 radio signal(s) in L1 frequency subband(s) respectively.

Herein, the second signaling indicates L2 frequency subband(s), the L1 frequency subband(s) is(are) a subset of the L2 frequency subband(s), the L2 is a positive integer not less than the L1, the L2 belongs and only belongs to a target first-type integer set among the K first-type integer sets, the target first-type integer set corresponds to a target transmission configuration among the K transmission configurations, and the multi-antenna related capability under the target transmission configuration is used for determining a number of antenna ports transmitting each of the L1 radio signal(s).

Specifically, according to one aspect of the disclosure, the method includes:

transmitting L1 scheduling signaling(s) through the air interface.

Herein, the L1 scheduling signaling(s) is(are) one-to-one corresponding to the L1 radio signal(s), and each of the L1 scheduling signaling(s) includes configuration information of a corresponding radio signal; and the multi-antenna related capability under the target transmission configuration is used for determining at least one of a payload size of each of the L1 scheduling signaling(s) or a format of each of the L1 scheduling signaling(s).

Specifically, according to one aspect of the disclosure, the multi-antenna related capability includes a number of layers.

The disclosure provides a UE for wireless communication, wherein the UE includes:

a first transmitter, to transmit K pieces of first-type information through an air interface, the K being a positive integer greater than 1.

Herein, the K pieces of first-type information indicate multi-antenna related capabilities of the UE under K transmission configurations respectively; the K transmission configurations all correspond to a first frequency band combination, and the first frequency band combination includes one or more frequency bands; numbers of parallel frequency subbands corresponding to the K transmission configurations belong to K first-type integer sets respectively, any one of the K first-type integer sets is composed of one or more positive integers, and any two of the K first-type integer sets are different.

In one embodiment, the above UE includes:

a first receiver, to receive a first signaling through the air interface.

Herein, the first signaling is used for determining Q transmission modes, the Q being a positive integer greater than 1; the Q transmission modes are all applied to a first frequency subband set, the first frequency subband set is composed of L frequency subband(s), the L being a positive integer; numbers of parallel frequency subbands corresponding to the Q transmission modes are Q second-type integer sets respectively; any one of the Q second-type integer sets is composed of one or more positive integers, and any two of the Q second-type integer sets are different; and the K pieces of first-type information are used for determining the Q transmission modes.

In one embodiment, the above UE is characterized in that:

the first receiver further receives a second signaling;

and the UE includes:

a first processor, to receive L1 radio signal(s) in L1 frequency subband(s) respectively, or to transmit L1 radio signal(s) in L1 frequency subband(s) respectively.

Herein, the second signaling indicates L2 frequency subband(s), the L1 frequency subband(s) is(are) a subset of the L2 frequency subband(s), the L2 is a positive integer not less than the L1, the L2 belongs and only belongs to a target first-type integer set among the K first-type integer sets, the target first-type integer set corresponds to a target transmission configuration among the K transmission configurations, and the multi-antenna related capability under the target transmission configuration is used for determining a number of antenna ports transmitting each of the L1 radio signal(s).

In one embodiment, the above UE is characterized in that:

the first receiver receives L1 scheduling signaling(s) through the air interface.

Herein, the L1 scheduling signaling(s) is(are) one-to-one corresponding to the L1 radio signal(s), and each of the L1 scheduling signaling(s) includes configuration information of a corresponding radio signal; and the multi-antenna related capability under the target transmission configuration is used for determining at least one of a payload size of each of the L1 scheduling signaling(s) or a format of each of the L1 scheduling signaling(s).

In one embodiment, the above UE is characterized in that: the multi-antenna related capability includes a number of layers.

In one embodiment, one layer corresponds to one transmitting antenna port.

In one embodiment, one layer corresponds to one uplink transmitting antenna port.

In one embodiment, one layer corresponds to one downlink transmitting antenna port.

The disclosure provides a base station for wireless communication, wherein the base station includes:

a second receiver, to receive K pieces of first-type information through an air interface, the K being a positive integer greater than 1.

Herein, the K pieces of first-type information indicate multi-antenna related capabilities of a transmitter of the K pieces of first-type information under K transmission configurations; the K transmission configurations all correspond to a first frequency band combination, and the first frequency band combination includes one or more frequency bands; numbers of parallel frequency subbands corresponding to the K transmission configurations belong to K first-type integer sets respectively, any one of the K first-type integer sets is composed of one or more positive integers, and any two of the K first-type integer sets are different.

In one embodiment, the above base station includes:

a second transmitter, to transmit a first signaling through the air interface.

Herein, the first signaling is used for determining Q transmission modes, the Q being a positive integer greater than 1; the Q transmission modes are all applied to a first frequency subband set, the first frequency subband set is composed of L frequency subband(s), the L being a positive integer; numbers of parallel frequency subbands corresponding to the Q transmission modes are Q second-type integer sets respectively; any one of the Q second-type integer sets is composed of one or more positive integers, and any two of the Q second-type integer sets are different; and the K pieces of first-type information are used for determining the Q transmission modes.

In one embodiment, the above base station is characterized in that:

the second transmitter further transmits a second signaling;

and the base station includes:

a second processor, to transmit L1 radio signal(s) in L1 frequency subband(s) respectively, or to receive L1 radio signal(s) in L1 frequency subband(s) respectively.

Herein, the second signaling indicates L2 frequency subband(s), the L1 frequency subband(s) is(are) a subset of the L2 frequency subband(s), the L2 is a positive integer not less than the L1, the L2 belongs and only belongs to a target first-type integer set among the K first-type integer sets, the target first-type integer set corresponds to a target transmission configuration among the K transmission configurations, and the multi-antenna related capability under the target transmission configuration is used for determining a number of antenna ports transmitting each of the L1 radio signal(s).

In one embodiment, the above base station is characterized in that:

the second transmitter transmits L1 scheduling signaling(s) through the air interface.

Herein, the L1 scheduling signaling(s) is(are) one-to-one corresponding to the L1 radio signal(s), and each of the L1 scheduling signaling(s) includes configuration information of a corresponding radio signal; and the multi-antenna related capability under the target transmission configuration is used for determining at least one of a payload size of each of the L1 scheduling signaling(s) or a format of each of the L1 scheduling signaling(s).

In one embodiment, the above base station is characterized in that: the multi-antenna related capability includes a number of layers.

In one embodiment, compared with the prior art, the disclosure mainly has the following technical advantages.

The disclosure can assign multiple RF chains of the UE to different frequency subbands to improve the peak rate of the UE.

When the number of parallel frequency subbands of the UE is small, the above method enables as many as possible RF chains to be concentrated into one frequency subband, to improve the efficiency of transmission.

The base station selects the appropriate Q transmission modes for the UE according to the K pieces of first-type information and a number of possible scheduled parallel frequency subbands, thereby avoiding configuring K transmission modes and reducing signaling overhead.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
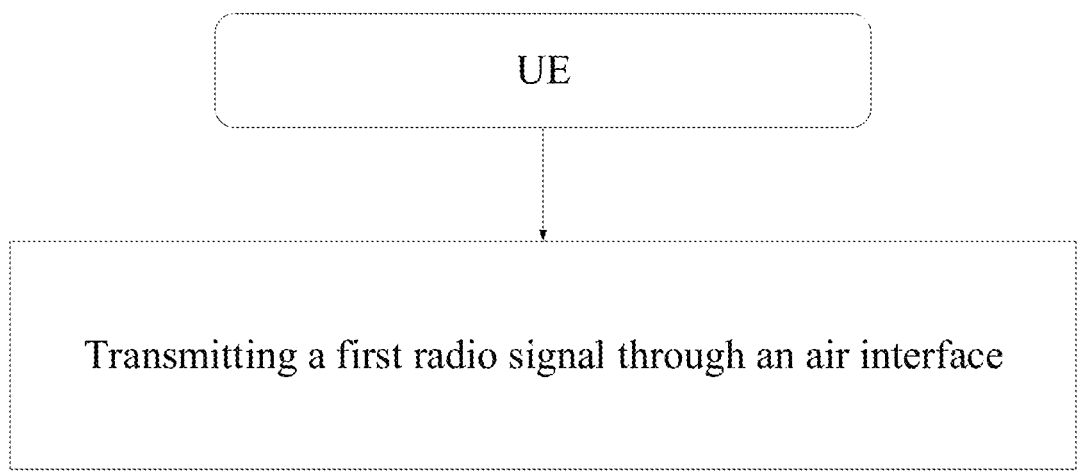
FIG. 1 is a flowchart of transmitting K pieces of first-type information according to one embodiment of the disclosure.

Embodiment 1 illustrates an example of a flowchart of transmitting K pieces of first-type information, as shown in FIG. 1.

In Embodiment 1, a UE transmits a first radio signal through an air interface, the first radio signal includes K pieces of first-type information, and the K is a positive integer greater than 1. Herein, the K pieces of first-type information indicate multi-antenna related capabilities of the UE under K transmission configurations respectively; the K transmission configurations all correspond to a first frequency band combination, and the first frequency band combination includes one or more frequency bands; numbers of parallel frequency subbands corresponding to the K transmission configurations belong to K first-type integer sets respectively, any one of the K first-type integer sets is composed of one or more positive integers, and any two of the K first-type integer sets are different.

In one embodiment, the first radio signal is an output of a first bit block processed in sequence through segment, channel coding, scrambling, modulation mapper, layer mapper, precoding, resource element mapper and wideband symbol generation, and the first bit block includes bits corresponding to the K pieces of first-type information.

In one embodiment, the transmitting of the first radio signal is a response from the UE to a received downlink query signaling.

In one embodiment, the downlink query signaling is configured dynamically.

In one embodiment, the downlink query signaling is an RRC layer signaling.

In one embodiment, the downlink query signaling is a UECapabilityEnquiry Information Element (IE).

In one embodiment, the K pieces of first-type information are a higher layer signaling.

In one embodiment, the K pieces of first-type information belong to a UECapabilityEnquiry IE.

In one embodiment, the K pieces of first-type information belong to a UE-EUTRA-Capability IE.

In one embodiment, the K pieces of first-type information belong to a UE-NR-Capability IE.

In one embodiment, the K pieces of first-type information belong to a UE-Capability-NR IE.

In one embodiment, the K pieces of first-type information belong to K phyLayerParameters IEs respectively.

In one embodiment, the first radio signal includes a BandCombinationParameters IE, the K pieces of first-type information belong to the BandCombinationParameters IE respectively, and the BandCombinationParameters IE is associated to the first frequency band combination.

In one embodiment, the first radio signal includes a BandParameters IE, the K pieces of first-type information belong to the BandParameters IE respectively, and the BandParameters IE is associated to the first frequency band combination.

In one embodiment, the K pieces of first-type information belong to K mimo-UE-Parameters IEs respectively.

In one embodiment, the K pieces of first-type information include K MIMO-CapabilityDL fields respectively.

In one embodiment, the multi-antenna related capability includes a number of panels.

In one embodiment, the multi-antenna related capability includes a number of layers.

In one embodiment, the multi-antenna related capability includes a maximum number of needed Phase Tracking Reference Signal (PTRS) antenna ports.

In one embodiment, the air interface is an LTE-Uu interface.

In one embodiment, the air interface is a radio interface.

In one embodiment, the first radio signal indicates the first frequency band combination.

In one embodiment, a number of frequency bands included in the first frequency band combination is indicated by a maxSimultaneousBands field.

In one embodiment, each frequency band in the first frequency band combination is indicated by a bandEUTRA field carried in the first radio signal.

In one embodiment, at least two of the K first-type integer sets include different numbers of positive integers.

Embodiment 2

Figure 2:
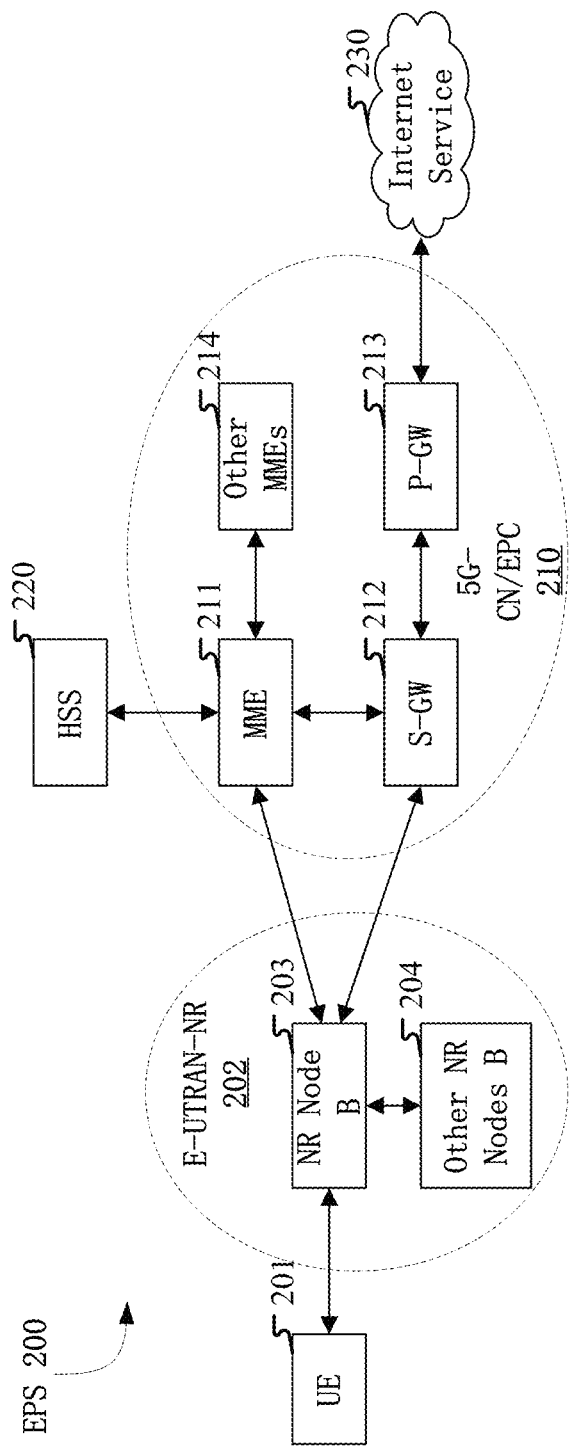
FIG. 2 is a diagram illustrating a network architecture according to one embodiment of the disclosure.

Embodiment 2 illustrates an example of a diagram of a network architecture, as shown in FIG. 2.

FIG. 2 illustrates a network architecture 200 of Long-Term Evolution (LTE), Long-Term Evolution Advanced (LTE-A) and future 5G systems. The LTE network architecture 200 may be called an Evolved Packet System (EPS) 200. The EPS 200 may include one or more UEs 201, an Evolved UMTS Terrestrial Radio Access Network-New Radio (E-UTRAN-NR) 202, a 5G-Core Network/Evolved Packet Core (5G-CN/EPC) 210, a Home Subscriber Server (HSS) 220 and an Internet Service 230. Herein, the UMTS represents Universal Mobile Telecommunication System. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services. The E-UTRAN-NR includes an NR node B (gNB) 203 and other gNBs 204. The gNB 203 provides UE 201 oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Basic Service Set (BSS), an Extended Service Set (ESS), a Transmitter Receiver Point (TRP) or other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or other appropriate terms. The gNB 203 is connected to the 5G-CN/EPC 210 via an S1 interface. The 5G-CN/EPC 210 includes an MME 211, other MMEs 214, a Service Gateway (S-GW) 212 and a Packet Data Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IP IMSs) and Packet Switching Streaming Services (PSSs).

In one embodiment, the UE 201 corresponds to the UE in the disclosure.

In one embodiment, the eNB 203 corresponds to the base station in the disclosure.

In one embodiment, information interaction between the UE 201 and the E-UTRAN-NR 202 is completed through an air interface.

Embodiment 3

Figure 3:
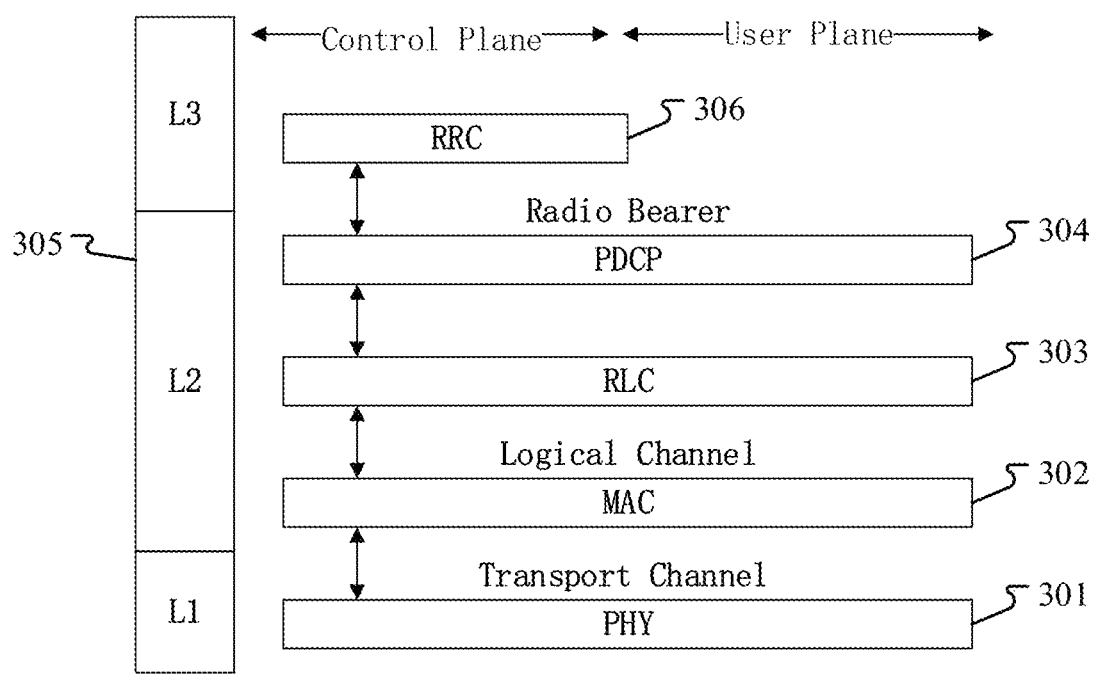
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a gNB is represented by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown, the UE may include several higher layers above the L2 layer 305, including a network layer (i.e. IP layer) terminated at the P-GW 213 on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one embodiment, the radio protocol architecture shown in FIG. 3 is applicable to the UE in the disclosure.

In one embodiment, the radio protocol architecture shown in FIG. 3 is applicable to the base station in the disclosure.

In one embodiment, the higher layer in disclosure is one layer or sublayer above the PHY 301.

In one embodiment, the physical layer in the disclosure refers to the PHY 301 layer.

In one embodiment, the physical layer signaling or DCI in the disclosure is generated on the PHY 301.

In one embodiment, the K pieces of first-type information in the disclosure are generated on the RRC sublayer 306.

In one embodiment, the first signaling in the disclosure is generated on the MAC sublayer 302.

In one embodiment, the first signaling in the disclosure is generated on the RRC sublayer 306.

In one embodiment, the second signaling in the disclosure is generated on the MAC sublayer 302.

In one embodiment, the second signaling in the disclosure is generated on the PHY 301 layer.

In one embodiment, the L1 scheduling signaling(s) in the disclosure is(are) generated on the PHY 301 layer.

Embodiment 4

Figure 4:
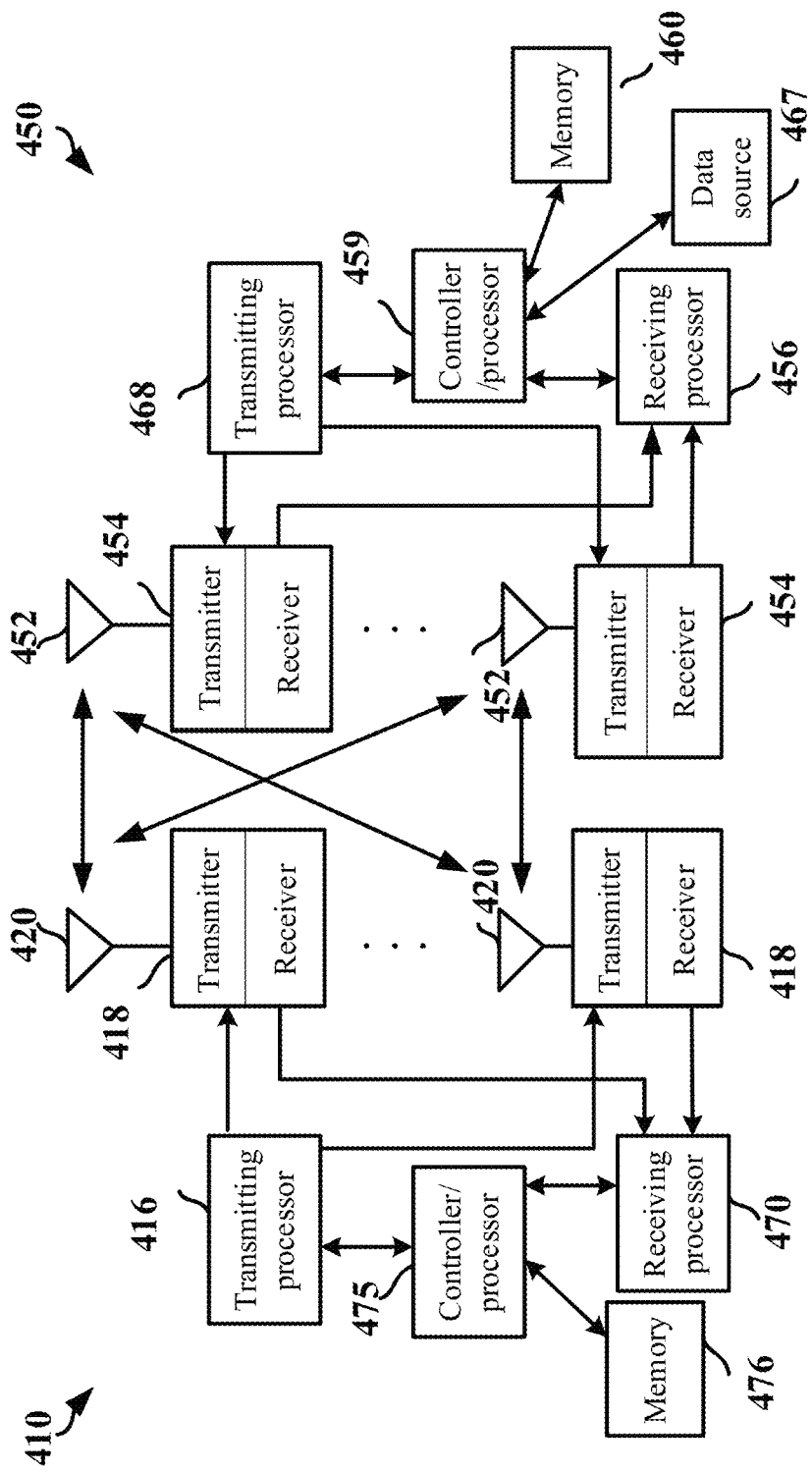
FIG. 4 is a diagram illustrating an eNB and a UE according to one embodiment of the disclosure.

Embodiment 4 illustrates an example of a diagram of an evolved node B and a UE, as shown in FIG. 4.

FIG. 4 is a block diagram of a gNB 410 in communication with a UE 450 in an access network. In Downlink (DL), a higher-layer packet from a core network is provided to the controller/processor 475. The controller/processor 475 provides functions of Layer 2. In DL, the controller/processor 475 provides header compression, encryption, packet segmentation and reordering, multiplexing between a logical channel and a transport channel, and a radio resource allocation for the node 450 based on various priority metrics. The controller/processor 475 is also in charge of HARQ operation, retransmission of lost packets, and signalings to the UE 450. The transmitting processor 416 performs various signal processing functions used for Layer 1 (that is, PHY). The signal processing functions include encoding and interleaving so as to ensure FEC (Forward Error Correction) at the UE 450 and mappings to signal clusters corresponding to different modulation schemes (i.e., BPSK, QPSK, M-PSK M-QAM, etc.). Then, the encoded and modulated symbols are split into parallel streams, then each stream is mapped to multicarrier subcarriers to be multiplexed with a reference signal (i.e., pilot) in time domain and/or frequency domain, and then they are combined together using Inverse Fast Fourier Transform (IFFT) to generate a physical channel carrying time-domain multicarrier symbol streams. The multicarrier streams are processed with spatial pre-decoding to generate multiple spatial streams. Each spatial stream is subsequently provided by the transmitter 418 to different antennas 420. Each transmitter 418 modulates a corresponding spatial stream to be transmitted onto a Radio Frequency (RF) subcarrier. At the UE 450, each receiver 454 receives a signal via the corresponding antenna 452. Each receiver 454 recovers the information modulated onto the RF carrier and provides the information to the receiving processor 456. The receiving processor 456 performs various signal processing functions of Layer 1. The receiving processor 456 processes the information with spatial process to recover any spatial stream targeting the UE 450. If there are multiple spatial stream are targeting the UE 450, they can be combined into one single multicarrier symbol stream through the receiving processor 456. The receiving processor 456 then converts the multicarrier symbol stream from time domain to frequency domain using FFT. A frequency-domain signal includes a single multicarrier symbol stream of each subcarrier used for multicarrier signals. The symbols on each subcarrier and the reference signal are recovered and demodulated by determining a most possible signal cluster point transmitted by the gNB 410, and generate a soft decision. The soft decision is decoded and de-interleaved to recover the data and control signal originally transmitted by the gNB 410 on a physical channel. Then the data and control signal are provided to the controller/processor 459. The controller/processor 459 performs functions of Layer 2. The controller/processor 459 may be connected to the memory 460 that stores program codes and data. The memory 460 may be called a computer readable media. In DL, the controller/processor 459 provides multiplexing between the transport channel and the logical channel, packet reassembling, decryption, header decompression, and control signal processing so as to recover the higher-layer packet coming from the core network. Then, the higher-layer packet is provided all protocol layers above the L2 layer. Various control signals can also be provided to L3 for L3 processing. The controller/processor 459 can also perform error detection using ACK and/or NACK protocols to support the HARQ operation. In UL, the data source 467 provides a higher-layer packet to the controller/processor 459. The data source 467 illustrates all protocol layers above the L2 layer. Similar as the transmitting function of the eNB 410 described in DL transmission, the controller/processor 459 provides header compression, encryption, packet segmentation and reordering, and multiplexing between a logical channel and a transport channel based on the radio resource allocation of the base station 410 so as to provide the functions of Layer 2 used for the control plane and user plane. The controller/processor 459 is also in charge of HARQ operation, retransmission of lost packets, and signalings to the eNB 410. The transmitting processor 468 selects proper encoding and modulation schemes and facilitates spatial processing. A spatial stream generated by the transmitting processor 468 is provided to different antennas 452 via a single transmitter 454. Each transmitter 454 modulates a corresponding spatial stream to be transmitted onto an RF subcarrier. The function of the gNB 410 is similar as the receiving function of the UE 450 described in the DL transmission. Each receiver 418 receives a signal via the corresponding antenna 420. Each receiver 418 recovers the information modulated onto the RF carrier, and provides the information to the receiving processor 470. The receiving processor 470 provides functions of Layer 1. The controller/processor 475 provides functions of Layer 2. The controller/processor 475 may be connected to the memory 476 that stores program codes and data. The memory 476 may be called a computer readable media. In UL, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network. The controller/processor 475 can also perform error detection using ACK and/or NACK protocols to support the HARQ operation.

In one embodiment, the UE 450 includes at least one processor and at least one memory. The at least one memory includes computer program codes. The at least one memory and the computer program codes are configured to be used in collaboration with the at least one processor.

In one embodiment, the UE 450 includes a memory that stores a computer readable instruction program. The computer readable instruction program generates an action when executed by at least one processor.

In one embodiment, the action at the UE side 450 includes: transmitting the K pieces of first-type information in the disclosure through an air interface.

In one embodiment, the action at the UE side 450 includes: receiving the first signaling in the disclosure through the air interface.

In one embodiment, the action at the UE side 450 includes: receiving the second signaling in the disclosure; and receiving the L1 radio signal(s) in the disclosure in the L1 frequency subband(s) in the disclosure respectively, or transmitting the L1 radio signal(s) in the disclosure in the L1 frequency subband(s) in the disclosure respectively.

In one embodiment, the gNB 410 includes at least one processor and at least one memory. The at least one memory includes computer program codes. The at least one memory and the computer program codes are configured to be used in collaboration with the at least one processor.

In one embodiment, the gNB 410 includes a memory that stores a computer readable instruction program. The computer readable instruction program generates an action when executed by at least one processor.

In one embodiment, the action at the gNB 410 includes: receiving the K pieces of first-type information in the disclosure through an air interface.

In one embodiment, the action at the gNB 410 includes: transmitting the first signaling in the disclosure through the air interface.

In one embodiment, the action at the gNB 410 includes: transmitting the second signaling in the disclosure; and transmitting the L1 radio signal(s) in the disclosure in L1 frequency subband(s) in the disclosure respectively, or receiving the L1 radio signal(s) in the disclosure in the L1 frequency subband(s) in the disclosure respectively.

In one embodiment, the UE 450 corresponds to the UE in the disclosure.

In one embodiment, the gNB 410 corresponds to the base station in the disclosure.

In one embodiment, at least the former two of the transmitter 418 (including antenna 420), the transmitting processor 416 and the controller/processor 475 are used for receiving the K pieces of first-type information in the disclosure; and at least the former two of the receiver 454 (including antenna 452), the receiving processor 456 and the controller/processor 459 are used for transmitting the K pieces of first-type information in the disclosure.

In one embodiment, at least the former two of the transmitter 418 (including antenna 420), the transmitting processor 416 and the controller/processor 475 are used for transmitting the first signaling in the disclosure; and at least the former two of the receiver 454 (including antenna 452), the receiving processor 456 and the controller/processor 459 are used for receiving the first signaling in the disclosure.

In one embodiment, at least the former two of the transmitter 418 (including antenna 420), the transmitting processor 416 and the controller/processor 475 are used for transmitting the second signaling in the disclosure; and at least the former two of the receiver 454 (including antenna 452), the receiving processor 456 and the controller/processor 459 are used for receiving the second signaling in the disclosure.

In one embodiment, at least the former two of the transmitter 418 (including antenna 420), the transmitting processor 416 and the controller/processor 475 are used for transmitting the L1 radio signal(s) in the disclosure; and at least the former two of the receiver 454 (including antenna 452), the receiving processor 456 and the controller/processor 459 are used for receiving the L1 radio signal(s) in the disclosure.

In one embodiment, at least the former two of the transmitter 418 (including antenna 420), the transmitting processor 416 and the controller/processor 475 are used for receiving the L1 radio signal(s) in the disclosure; and at least the former two of the receiver 454 (including antenna 452), the receiving processor 456 and the controller/processor 459 are used for transmitting the L1 radio signal(s) in the disclosure.

In one embodiment, at least the former two of the transmitter 418 (including antenna 420), the transmitting processor 416 and the controller/processor 475 are used for transmitting the L1 scheduling signaling(s) in the disclosure; and at least the former two of the receiver 454 (including antenna 452), the receiving processor 456 and the controller/processor 459 are used for receiving the L1 scheduling signaling(s) in the disclosure.

Embodiment 5

Figure 5:
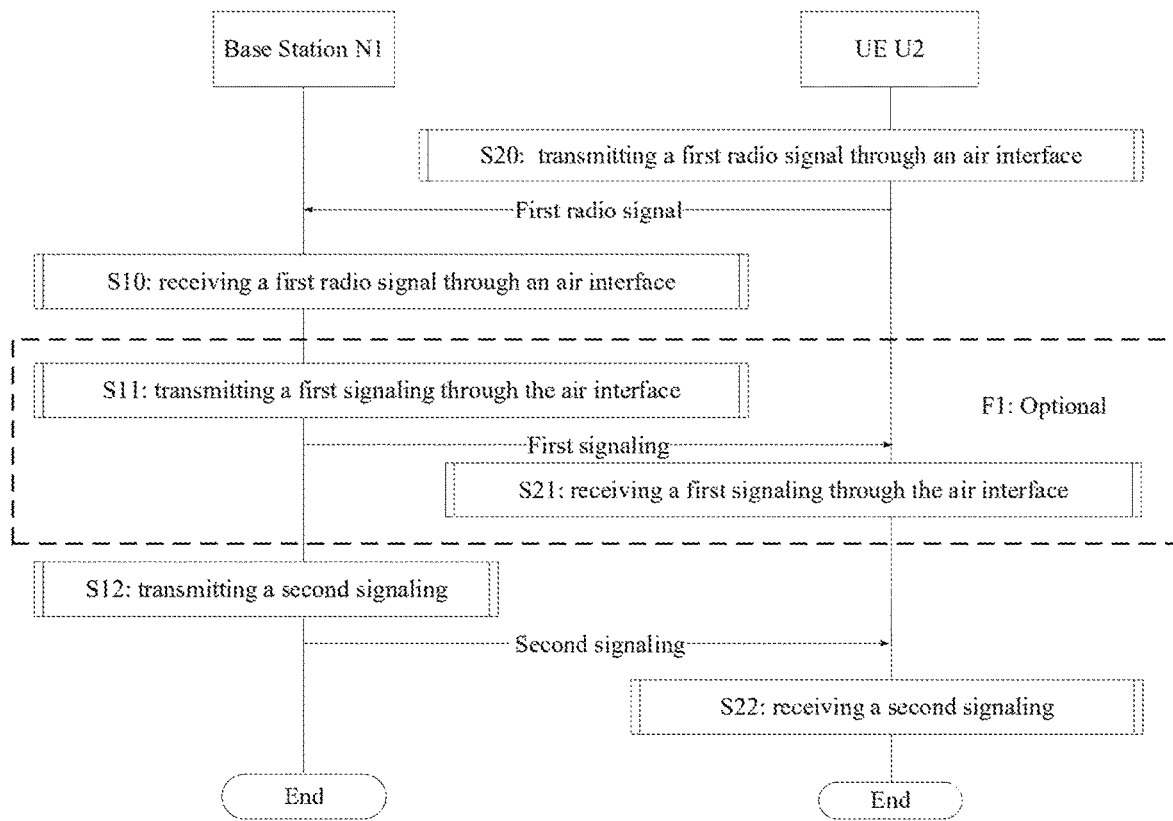
FIG. 5 is a flowchart of configurating a transmission mode according to one embodiment of the disclosure.

Embodiment 5 illustrates an example of a flowchart of configurating a transmission mode, as shown in FIG. 5. In FIG. 5, a base station N1 is a maintenance base station for a serving cell of a UE U2. In FIG. 5, steps in box F1 are optional.

The base station N1 receives a first radio signal through an air interface in S10, transmits a first signaling through the air interface in S11, and transmits a second signaling through the air interface in S12.

The UE U2 transmits the first radio signal through the air interface in S20, receives the first signaling through the air interface in S21, and receives the second signaling through the air interface in S22.

In Embodiment 5, the first radio signal includes K pieces of first-type information, the K is a positive integer greater than 1, and the K pieces of first-type information indicate multi-antenna related capabilities of the UE U2 under K transmission configurations respectively; the K transmission configurations all correspond to a first frequency band combination, and the first frequency band combination includes one or more frequency bands; numbers of parallel frequency subbands corresponding to the K transmission configurations belong to K first-type integer sets respectively, any one of the K first-type integer sets is composed of one or more positive integers, and any two of the K first-type integer sets are different; the first signaling is used for determining Q transmission modes, the Q being a positive integer greater than 1; the Q transmission modes are all applied to a first frequency subband set, the first frequency subband set is composed of L frequency subband(s), the L being a positive integer; numbers of parallel frequency subbands corresponding to the Q transmission modes are Q second-type integer sets respectively; any one of the Q second-type integer sets is composed of one or more positive integers, and any two of the Q second-type integer sets are different; the K pieces of first-type information are used for determining the Q transmission modes; the second signaling indicates L2 frequency subband(s), the L2 belongs and only belongs to one of the K first-type integer sets, that is, a target first-type integer set, the target first-type integer set corresponds to a target transmission configuration among the K transmission configurations.

In one embodiment, one of the K first-type integer sets is 1.

In one embodiment, one of the K first-type integer sets is 2.

In one embodiment, one of the K first-type integer sets includes multiple positive integers, and any one of the multiple positive integers is greater than 1.

In one embodiment, the frequency subband is a carrier.

In one embodiment, the frequency subband is a BWP.

In one embodiment, the first signaling is an RRC signaling.

In one embodiment, each of the Q transmission modes includes a number of layers.

In one embodiment, the L is greater than 1, for each frequency subband in the first frequency subband set, the first signaling indicates explicitly the Q transmission modes.

In one embodiment, the Q second-type integer sets are one-to-one corresponding to Q first-type integer sets among the K first-type integer sets, and the Q second-type integer sets are subsets of corresponding first-type integer sets respectively.

In one embodiment, the Q transmission modes are one-to-one corresponding to multi-antenna related capabilities under Q transmission configurations among the K transmission configurations, and numbers of parallel frequency subbands corresponding to the Q transmission configurations belong to the Q first-type integer sets respectively.

In one embodiment, a number of layers included in any one of the Q transmission modes is a subset of a number of layers included in a corresponding multi-antenna related capability.

In one embodiment, a number of panels included in any one of the Q transmission modes is equal to a number of panels included in a corresponding multi-antenna related capability.

In one embodiment, a number of analog beams included in any one of the Q transmission modes is equal to a subset of a number of analog beams included in a corresponding multi-antenna related capability.

Embodiment 6

Figure 6:
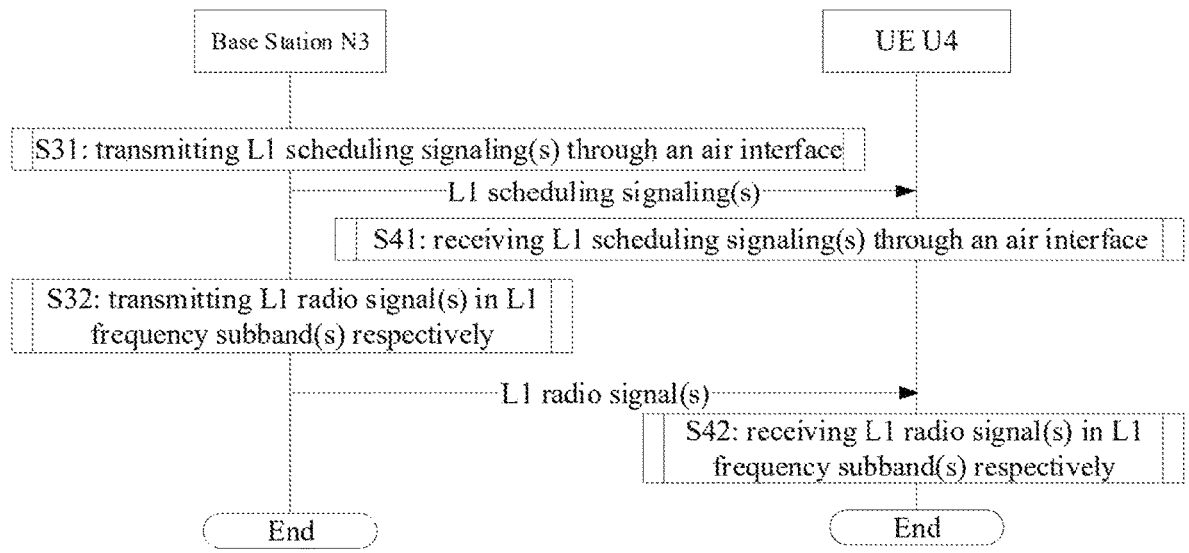
FIG. 6 is a flowchart of downlink transmission according to one embodiment of the disclosure.

Embodiment 6 illustrates an example of a flowchart of downlink transmission, as shown in FIG. 6. In FIG. 6, a base station N3 is a maintenance base station for a serving cell of a UE U4.

The base station N3 transmits L1 scheduling signaling(s) through an air interface in S31, and transmits L1 radio signal(s) in L1 frequency subband(s) respectively in S32.

The UE U4 receives the L1 scheduling signaling(s) through the air interface in S41, and receives the L1 radio signal(s) in the L1 frequency subband(s) respectively in S42.

In Embodiment 6, the L1 frequency subband(s) is(are) a subset of the L2 frequency subband(s) in Embodiment 5, the L2 is a positive integer not less than the L1, the L1 scheduling signaling(s) is(are) one-to-one corresponding to the L1 radio signal(s), and each of the L1 scheduling signaling(s) includes configuration information of a corresponding radio signal; and the multi-antenna related capability under the target transmission configuration in Embodiment 5 is used for determining at least one of a payload size of each of the L1 scheduling signaling(s) or a format of each of the L1 scheduling signaling(s); and the multi-antenna related capability under the target transmission configuration is used for determining a number of antenna ports transmitting each of the L1 radio signal(s).

In one embodiment, the multi-antenna related capability under the target transmission configuration indicates implicitly a first integer set, the first integer set is composed of multiple positive integers, and a number of antenna ports transmitting each of the L1 radio signal(s) belongs to the first integer set.

In one subembodiment, the configuration information in a corresponding scheduling signaling is used for determining, from the first integer set, a number of antenna ports transmitting each of the L1 radio signal(s).

In one embodiment, the multi-antenna related capability under the target transmission configuration indicates explicitly a first integer, and a number of antenna ports transmitting each of the L1 radio signal(s) is equal to the first integer.

In one embodiment, each of the L1 scheduling signaling(s) includes one multi-antenna related configuration field, and a number of bits in the multi-antenna related configuration field is related to the multi-antenna related capability under the target transmission configuration.

In one embodiment, whether each of the L1 scheduling signaling(s) includes one multi-antenna related configuration field is related to the multi-antenna related capability under the target transmission configuration.

In one embodiment, the multi-antenna related configuration field includes an MCS for a second codeword.

In one embodiment, the multi-antenna related configuration field includes a RV for a second codeword.

In one embodiment, the multi-antenna related configuration field includes an NDI for a second codeword.

In one embodiment, the multi-antenna related configuration field includes a Transmission Precoding Matrix Indicator (TPMI).

In one embodiment, the multi-antenna related configuration field includes a Transmission Configuration Indicator (TCI).

In one embodiment, a signaling format of each of the L1 scheduling signaling(s) is one signaling format in a candidate format set, the candidate format set includes P1 signaling format(s), the P1 is a positive integer, and at least one signaling format in the candidate format set is related to the multi-antenna related capability under the target transmission configuration.

In one embodiment, the P1 is 2.

In one embodiment, the signaling format is a DCI format.

In one embodiment, the L1 scheduling signaling(s) is(are) all downlink grant DCI(s).

In one embodiment, a transport channel corresponding to each of the L1 radio signal(s) is a DownLink Shared Channel (DL-SCH).

In one embodiment, each of the L1 radio signal(s) is transmitted on a physical layer data channel (that is, a physical layer channel capable of carrying physical layer data).

In one embodiment, each of the L1 radio signal(s) includes at least one Transport Block (TB).

Embodiment 7

Figure 7:
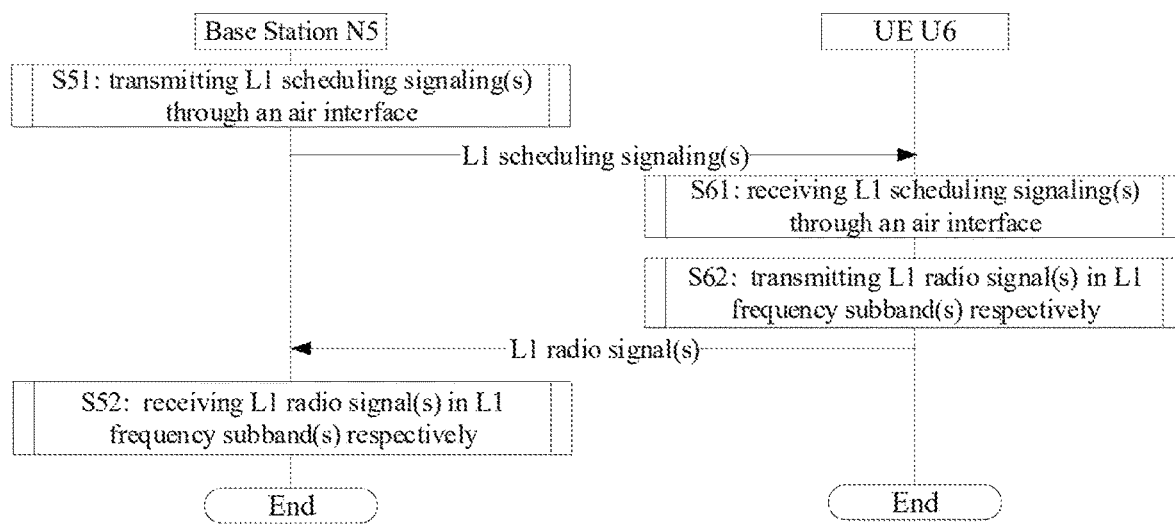
FIG. 7 is a flowchart of uplink transmission according to one embodiment of the disclosure.

Embodiment 7 illustrates an example of a flowchart of uplink transmission, as shown in FIG. 7. In FIG. 7, a base station N5 is a maintenance base station for a serving cell of a UE U6.

The base station N5 transmits L1 scheduling signaling(s) through an air interface in S51, and receives L1 radio signal(s) in L1 frequency subband(s) respectively in S52.

The UE U6 receives the L1 scheduling signaling(s) through the air interface in S61, and transmits the L1 radio signal(s) in the L1 frequency subband(s) respectively in S62.

In Embodiment 7, the L1 frequency subband(s) is(are) a subset of the L2 frequency subband(s) in Embodiment 5, the L2 is a positive integer not less than the L1, the L1 scheduling signaling(s) is(are) one-to-one corresponding to the L1 radio signal(s), and each of the L1 scheduling signaling(s) includes configuration information of a corresponding radio signal; and the multi-antenna related capability under the target transmission configuration in Embodiment 5 is used for determining at least one of a payload size of each of the L1 scheduling signaling(s) or a format of each of the L1 scheduling signaling(s); and the multi-antenna related capability under the target transmission configuration is used for determining a number of antenna ports transmitting each of the L1 radio signal(s).

In one embodiment, the L1 scheduling signaling(s) is(are) all uplink grant DCI(s).

In one embodiment, a transport channel corresponding to each of the L1 radio signal(s) is an UpLink Shared Channel (UL-SCH).

In one embodiment, each of the L1 radio signal(s) is transmitted on a physical layer data channel (that is, a physical layer channel capable of carrying physical layer data).

In one embodiment, each of the L1 radio signal(s) includes at least one Transport Block (TB).

Embodiment 8

Figure 8:
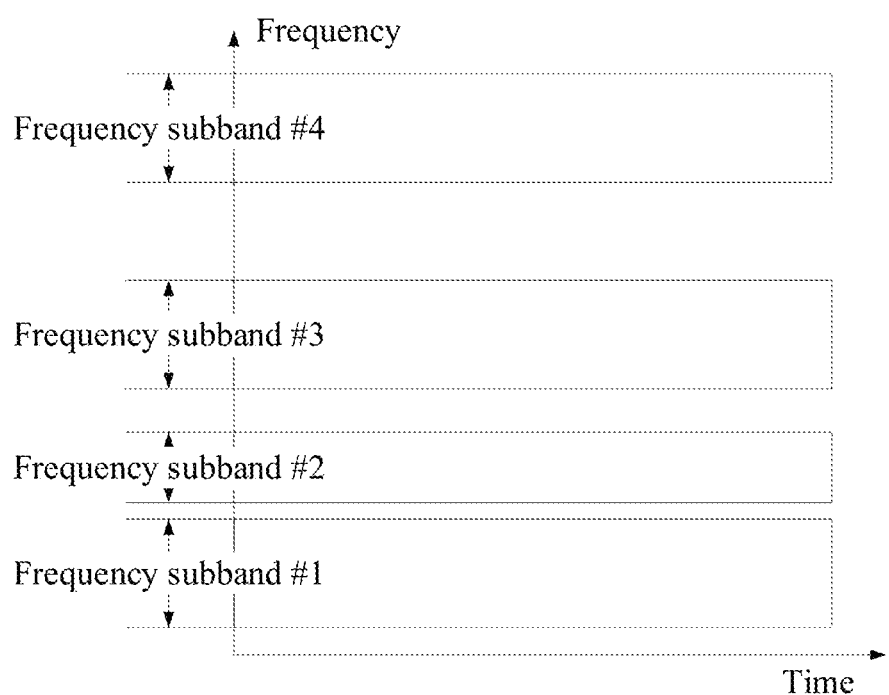
FIG. 8 is a diagram illustrating a frequency subband according to one embodiment of the disclosure.

Embodiment 8 illustrates an example of a diagram of a frequency subband, as shown in FIG. 8.

The first frequency band combination in the disclosure covers in frequency domain a frequency subband #1, a frequency subband #2, a frequency subband #3 and a frequency subband #4. The frequency subband #1, the frequency subband #2, the frequency subband #3 and the frequency subband #4 are all consecutive in frequency domain.

In one embodiment, the frequency subband #1 and the frequency subband #2 belong to a first frequency band; the frequency subband #3 and the frequency subband #4 belong a second frequency band; the first frequency band and the second frequency band are one frequency band in the first frequency band combination respectively.

In one embodiment, the frequency subband #1, the frequency subband #2, the frequency subband #3 and the frequency subband #4 all belong to a third frequency band, and the third frequency band is one frequency band in the first frequency band combination.

In one embodiment, the frequency subband #1, the frequency subband #2, the frequency subband #3 and the frequency subband #4 form the first frequency subband set in the disclosure.

In one embodiment, the L2 in the disclosure is 4, and the L2 frequency subbands in the disclosure are the frequency subband #1, the frequency subband #2, the frequency subband #3 and the frequency subband #4 respectively.

In one embodiment, the K in the disclosure is 2, and the K first-type integer sets in the disclosure are {1} and {2, 3, 4} respectively.

In one subembodiment, the multi-antenna related capabilities under K transmission configurations in the disclosure include a first capability and a second capability.

A number of parallel frequency subbands corresponding to the first capability is 1, and a number of layers corresponding to the first capability is one of 1, 2, 4, 8 or 16.

A number of parallel frequency subbands corresponding to the second capability is 2, 3 or 4, and a number of layers corresponding to the second capability is one of 1, 2, 4 or 8.

In one subembodiment, the UE in the disclosure is equipped with two panels.

In one embodiment, a number of panels corresponding to the first capability is 1 or 2, and a number of panels corresponding to the second capability is 1.

In one embodiment, the K in the disclosure is 3, and the K first-type integer sets in the disclosure are {1}, {2} and {3, 4} respectively.

In one subembodiment, the multi-antenna related capabilities under K transmission configurations in the disclosure include a third capability, a fourth capability and a fifth capability.

A number of parallel frequency subbands corresponding to the third capability is 1, and a number of layers corresponding to the third capability is one of 1, 2, 4, 8 or 16.

A number of parallel frequency subbands corresponding to the fourth capability is 2, and a number of layers corresponding to the fourth capability is one of 1, 2, 4 or 8.

A number of parallel frequency subbands corresponding to the fifth capability is 3 or 4, and a number of layers corresponding to the fifth capability is one of 1, 2 or 4.

Embodiment 9

Figure 9:
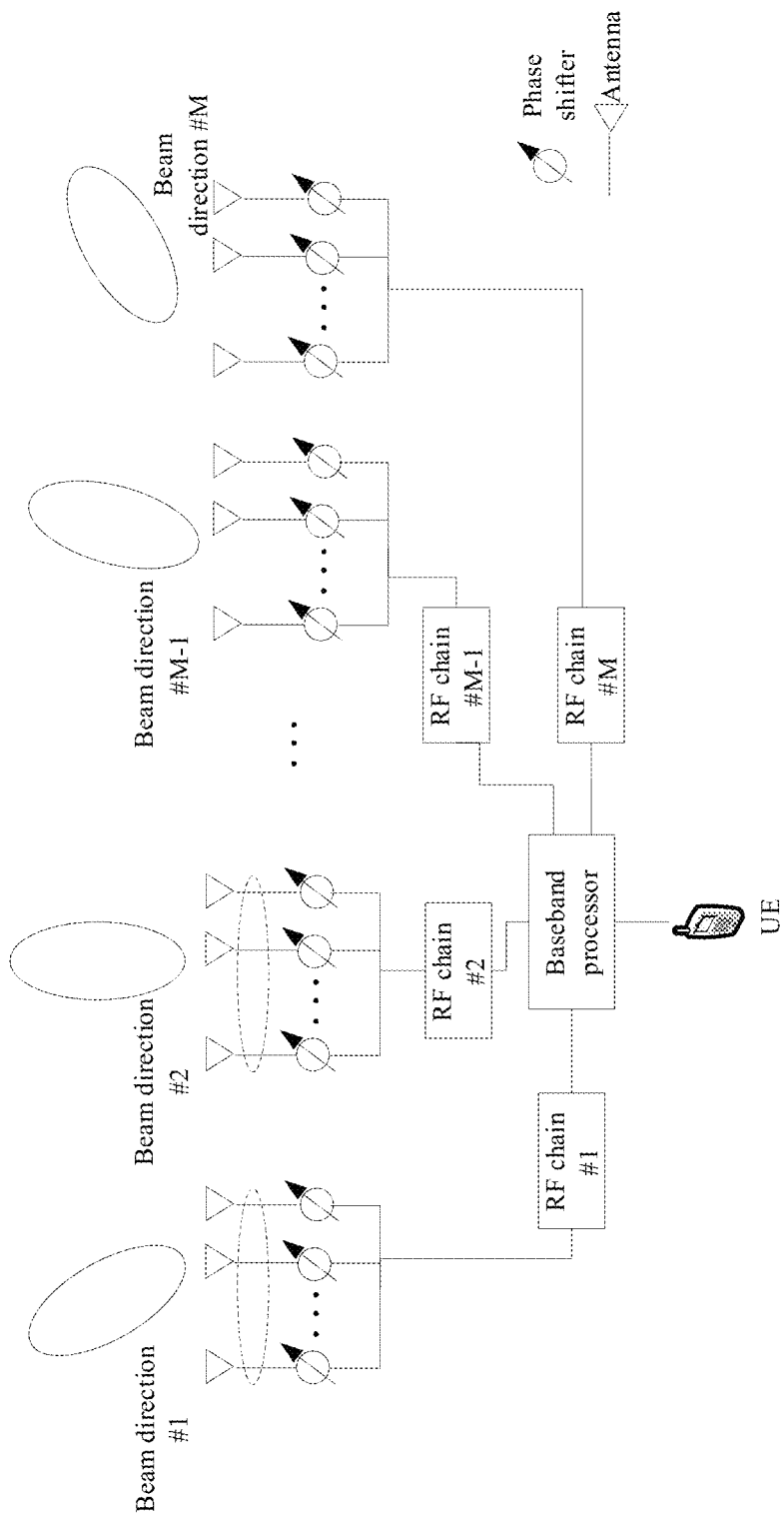
FIG. 9 is a diagram illustrating an antenna structure equipped on a UE according to one embodiment of the disclosure.

Embodiment 9 illustrates an example of a diagram of an antenna structure equipped on a UE, as shown in FIG. 9. In FIG. 9, the UE is equipped with M Radio Frequency (RF) chains, which are an RF chain #1, an RF chain #2, . . . , an RF chain #M respectively. The M RF chains are connected to one baseband processor.

In one embodiment, any one of the M RF chains supports a bandwidth not larger than a bandwidth of a frequency subband configured for the UE.

In one embodiment, M1 RF chains among the M RF chains generate one antenna port through antenna virtualization superposition, the M1 RF chains are connected to M1 antenna groups respectively, and each of the M1 antenna groups includes a positive integer number of antennas. One antenna group is connected to a baseband processor through one RF chain, and different antenna groups correspond to different RF chains. Mapping coefficients from antennas included in any one of the M1 antenna groups to the antenna port constitute an analog beamforming vector of the antenna group. Analog beamforming vectors corresponding to the M1 antenna groups are diagonally arranged to form an analog beamforming matrix of the antenna port. Mapping coefficients from the M1 antenna groups to the antenna port constitute a digital beamforming vector corresponding to the antenna port.

In one embodiment, the M1 RF chains belong to one same panel.

In one embodiment, the M1 RF chains are QCLed.

In one embodiment, M2 RF chains among the M RF chains generate one receiving beam through antenna virtualization superposition, the M2 RF chains are connected to M2 antenna groups respectively, and each of the M2 antenna groups includes a positive integer number of antennas. One antenna group is connected to a baseband processor through one RF chain, and different antenna groups correspond to different RF chains. Mapping coefficients from antennas included in any one of the M2 antenna groups to the receiving beam constitute an analog beamforming vector of the receiving beam. Analog beamforming vectors corresponding to the M2 antenna groups are diagonally arranged to form an analog beamforming matrix of the receiving beam. Mapping coefficients from the M2 antenna groups to the receiving beam constitute a digital beamforming vector corresponding to the receiving beam.

In one embodiment, the M2 RF chains belong to one same panel.

In one embodiment, the M2 RF chains are QCLed.

In one embodiment, the directions of analog beams formed by the M RF chains are a beam direction #1, a beam direction #2, a beam direction #M−1 and a beam direction #M as shown in FIG. 9 respectively.

In one embodiment, the UE in Embodiment 9 is the UE U4 illustrated in Embodiment 6, any one of the M1 RF chains can receive a corresponding radio signal in one of the L1 frequency subbands only.

In one embodiment, the UE in Embodiment 9 is the UE U6 illustrated in Embodiment 7, any one of the M1 RF chains can transmit a corresponding radio signal in one of the L1 frequency subbands only.

In one embodiment, the UE in Embodiment 9 is the UE U4 illustrated in Embodiment 6, if the L1 in Embodiment 6 is 1, all the M RF chains can receive radio signals in the L1 frequency subband; if the L1 in Embodiment 6 is 2, an RF chain #1, an RF chain #2, . . . , an RF chain #M/2 among the M RF chains receive radio signals in one of the L1 frequency subbands, and an RF chain #M/2+1, an RF chain #M/2+2, . . . , an RF chain #M among the M RF chains receive radio signals in the other frequency subband.

In one embodiment, the UE in Embodiment 9 is the UE U6 illustrated in Embodiment 7, if the L1 in Embodiment 7 is 1, all the M RF chains transmit radio signals in the L1 frequency subband; if the L1 in Embodiment 7 is 2, an RF chain #1, an RF chain #2, . . . , an RF chain #M/2 among the M RF chains transmit radio signals in one of the L1 frequency subbands, and an RF chain #M/2+1, an RF chain # M/2+2, . . . , an RF chain #M among the M RF chains transmit radio signals in the other frequency subband.

In one embodiment, the UE in Embodiment 9 is the UE U4 illustrated in Embodiment 6; if the L2 is 1 in Embodiment 6, the multiantenna relevant capability under the target transmission configuration indicates that a maximum number of antenna ports (at the base station side) used for transmitting each of the L1 radio signals can be M; if the L2 is 2 in Embodiment 6, the multiantenna relevant capability under the target transmission configuration indicates that a maximum number of antenna ports (at the base station side) used for transmitting each of the L1 radio signals can be M/2 only.

In one embodiment, the UE in Embodiment 9 is the UE U6 illustrated in Embodiment 7; if the L2 is 1 in Embodiment 7, the multiantenna relevant capability under the target transmission configuration indicates that a maximum number of antenna ports (at the UE U6 side) used for transmitting each of the L1 radio signals can be M; if the L2 is 2 in Embodiment 7, the multiantenna relevant capability under the target transmission configuration indicates that a maximum number of antenna ports (at UE U6 side) used for transmitting each of the L1 radio signals can be M/2 only.

In one embodiment, a total number of layers configured in each of parallel frequency subbands for the UE is less than or equal to the M.

In one embodiment, a total number of antenna ports configured in each of parallel frequency subbands for the UE is less than or equal to the M.

In one embodiment, for each of the parallel frequency subbands, a mapping relationship between a layer and an antenna port is related to both the number of layers and the number of antenna ports.

In one embodiment, for each of the parallel frequency subbands, a mapping relationship between a layer and an antenna port is default (that is, no explicit configuration is needed).

In one embodiment, a layer and an antenna port are in one-to-one correspondence.

In one embodiment, one layer is mapped to multiple antenna ports.

In one embodiment, the M is an even number, an RF chain #1, an RF chain #2, . . . , an RF chain #M/2 among the M RF chains are connected to a first panel, and an RF chain #M/2+1, an RF chain #M/2+2, . . . , an RF chain #M among the M RF chains are connected to a second panel.

In one embodiment, the first panel and the second panel employ different crystal oscillators respectively.

Embodiment 10

Figure 10:
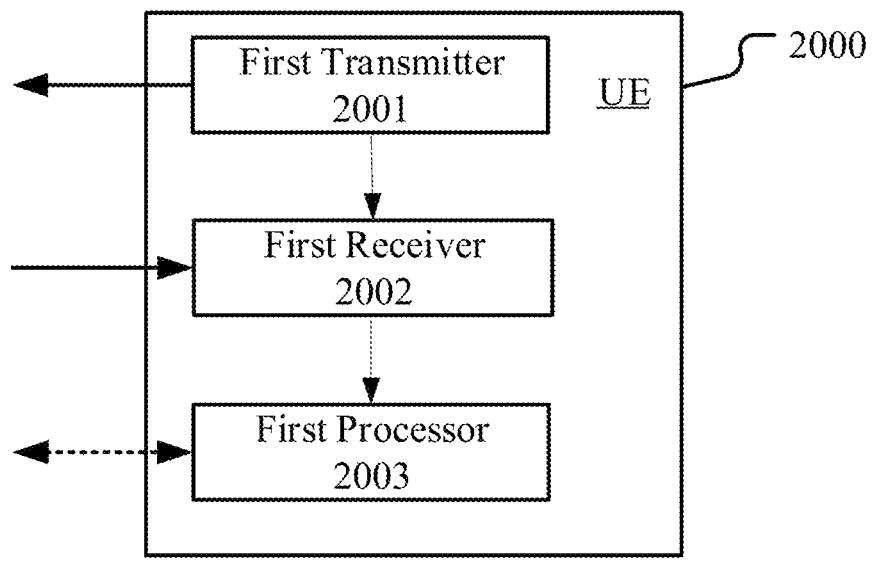
FIG. 10 is a structure block diagram illustrating a processing device in a UE according to one embodiment of the disclosure.

Embodiment 10 illustrates an example of a structure block diagram of a processing device in a UE, as shown in FIG. 10. In FIG. 10, the processing device 2000 in the UE mainly includes a first transmitter 2001, a first receiver 2002 and a first processor 2003.

The first transmitter 2001 transmits K pieces of first-type information through an air interface, the K being a positive integer greater than 1; the first receiver 2002 receives a second signaling through the air interface; the first processor 2003 receives L1 radio signal(s) in L1 frequency subband(s) respectively, or, transmits L1 radio signal(s) in L1 frequency subband(s) respectively.

In Embodiment 10, the K pieces of first-type information indicate multi-antenna related capabilities of the UE under K transmission configurations respectively; the K transmission configurations all correspond to a first frequency band combination, and the first frequency band combination includes one or more frequency bands; numbers of parallel frequency subbands corresponding to the K transmission configurations belong to K first-type integer sets respectively, any one of the K first-type integer sets is composed of one or more positive integers, and any two of the K first-type integer sets are different. The second signaling indicates L2 frequency subband(s), the L1 frequency subband(s) is(are) a subset of the L2 frequency subband(s), the L2 is a positive integer not less than the L1, the L2 belongs and only belongs to a target first-type integer set among the K first-type integer sets, the target first-type integer set corresponds to a target transmission configuration among the K transmission configurations, and the multi-antenna related capability under the target transmission configuration is used for determining a number of antenna ports transmitting each of the L1 radio signal(s).

In one embodiment, the first transmitter 2001 includes at least one of the transmitter/receiver 454 (including antenna 452), the transmitting processor 468 and the controller/processor 459 illustrated in FIG. 4 in the disclosure.

In one embodiment, the first transmitter 2001 includes the M RF chains, the M antenna groups and the baseband processor illustrated in FIG. 9 in the disclosure.

In one embodiment, the first receiver 2002 includes at least one of the transmitter/receiver 454 (including antenna 452), the receiving processor 456 and the controller/processor 459 illustrated in FIG. 4 in the disclosure.

In one embodiment, the first receiver 2002 includes the M RF chains, the M antenna groups and the baseband processor illustrated in FIG. 9 in the disclosure.

In one embodiment, the first processor 2003 includes the M RF chains, the M antenna groups and the baseband processor illustrated in FIG. 9 in the disclosure.

In one embodiment, the first processor 2003 transmits the L1 radio signal(s), and the first processor 2003 includes at least one of the transmitter/receiver 454 (including antenna 452), the transmitting processor 468 and the controller/processor 459 illustrated in FIG. 4 in the disclosure.

In one embodiment, the first processor 2003 receives the L1 radio signal(s), and the first processor 2003 includes at least one of the transmitter/receiver 454 (including antenna 452), the receiving processor 456 and the controller/processor 459 illustrated in FIG. 4 in the disclosure.

In one embodiment, the multi-antenna related capability includes a number of layers, or includes a number of antenna ports.

Embodiment 11

Figure 11:
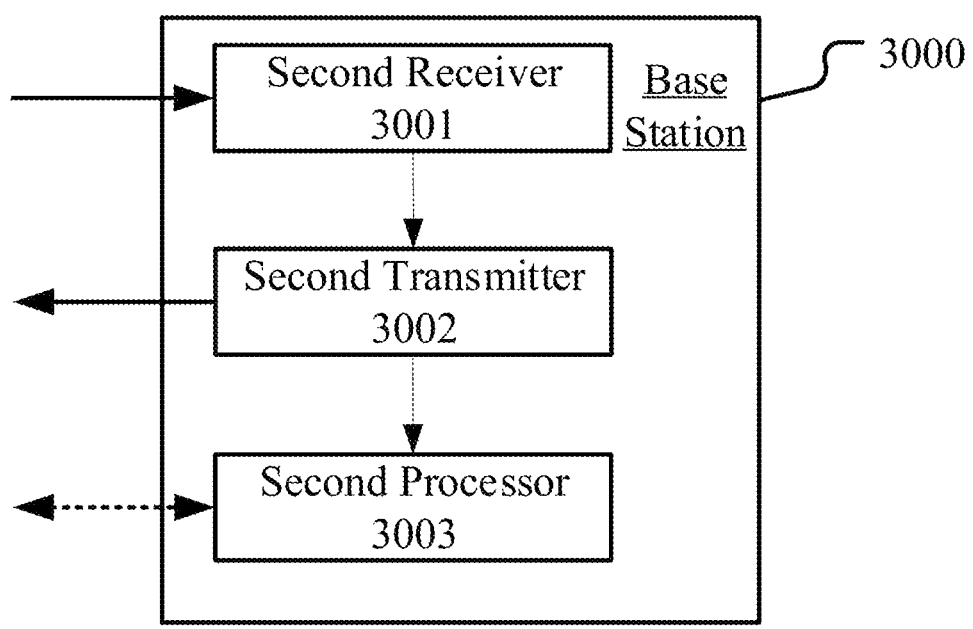
FIG. 11 is a structure block diagram illustrating a processing device in a base station according to one embodiment of the disclosure.

Embodiment 11 illustrates an example of a structure block diagram of a processing device in a base station, as shown in FIG. 11. In FIG. 11, the processing device 3000 in the base station mainly includes a second receiver 3001, a second transmitter 3002 and a second processor 3003.

The second receiver 3001 receives K pieces of first-type information through an air interface, the K being a positive integer greater than 1; the second transmitter 3002 transmits a second signaling through the air interface; and the second processor 3003 transmits L1 radio signal(s) in L1 frequency subband(s) respectively, or receives L1 radio signal(s) in L1 frequency subband(s) respectively.

In Embodiment 11, the K pieces of first-type information indicate multi-antenna related capabilities of a transmitter of the K pieces of first-type information under K transmission configurations; the K transmission configurations all correspond to a first frequency band combination, and the first frequency band combination includes one or more frequency bands; numbers of parallel frequency subbands corresponding to the K transmission configurations belong to K first-type integer sets respectively, any one of the K first-type integer sets is composed of one or more positive integers, and any two of the K first-type integer sets are different. The second signaling indicates L2 frequency subband(s), the L1 frequency subband(s) is(are) a subset of the L2 frequency subband(s), the L2 is a positive integer not less than the L1, the L2 belongs and only belongs to a target first-type integer set among the K first-type integer sets, the target first-type integer set corresponds to a target transmission configuration among the K transmission configurations, and the multi-antenna related capability under the target transmission configuration is used for determining a number of antenna ports transmitting each of the L1 radio signal(s).

In one embodiment, the second receiver 3001 includes at least one of the transmitter/receiver 418 (including antenna 420), the receiving processor 470 and the controller/processor 475.

In one embodiment, the second transmitter 3002 includes the transmitter/receiver 418 (including antenna 420), the transmitting processor 416 and the controller/processor 475 illustrated in FIG. 4 in the disclosure.

In one embodiment, the second processor 3003 transmits the L1 radio signal(s), and the second processor 3003 includes at least the former two of the transmitter/receiver 418 (including antenna 420), the transmitting processor 416 and the controller/processor 475 illustrated in FIG. 4 in the disclosure.

In one embodiment, the second processor 3003 receives the L1 radio signal(s), and the second processor 3003 includes at least one of the transmitter/receiver 418 (including antenna 420), the receiving processor 470 and the controller/processor 475 illustrated in FIG. 4 in the disclosure.

In one embodiment, the second signaling is a higher layer signaling.

In one embodiment, the second signaling is a physical layer signaling.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE or terminal in the disclosure includes but not limited to mobile phones, tablet computers, notebooks, network cards, low-power equipment, eMTC equipment, NB-IoT equipment, vehicle-mounted communication equipment, and other radio communication equipment. The base station or network side equipment in the disclosure includes but not limited to macro-cellular base stations, micro-cellular base stations, home base stations, relay base station, eNBs, gNBs, Transmitter Receiver Point (TRP) and radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for wireless communication, comprising:
    transmitting K pieces of first-type information through an air interface, the K being a positive integer greater than 1;
    wherein the K pieces of first-type information indicate multi-antenna related capabilities of the UE under K transmission configurations respectively; the K transmission configurations all correspond to a first frequency band combination, and the first frequency band combination comprises one or more frequency bands; numbers of parallel carriers corresponding to the K transmission configurations belong to K first-type integer sets respectively, any one of the K first-type integer sets is composed of one or more positive integers, and any two of the K first-type integer sets are different.

2. The method according to claim 1, comprising:
    receiving a first signaling through the air interface;
    wherein the first signaling is used for determining Q transmission modes, the Q being a positive integer greater than 1; the Q transmission modes are all applied to a first frequency subband set, the first frequency subband set is composed of L carrier(s), the L being a positive integer; numbers of parallel carriers corresponding to the Q transmission modes are Q second-type integer sets respectively; any one of the Q second-type integer sets is composed of one or more positive integers, and any two of the Q second-type integer sets are different; and the K pieces of first-type information are used for determining the Q transmission modes.

3. The method according to claim 1, comprising:
    receiving a second signaling; and
    receiving L1 radio signal(s) in L1 carrier(s) respectively, or transmitting L1 radio signal(s) in L1 carrier(s) respectively;
    wherein the second signaling indicates L2 carrier(s), the L1 carrier(s) is(are) a subset of the L2 carrier(s), the L2 is a positive integer not less than the L1, the L2 belongs and only belongs to a target first-type integer set among the K first-type integer sets, the target first-type integer set corresponds to a target transmission configuration among the K transmission configurations, and the multi-antenna related capability under the target transmission configuration is used for determining a number of antenna ports transmitting each of the L1 radio signal(s).

4. The method according to claim 3, comprising:
    receiving L1 scheduling signaling(s) through the air interface;
    wherein the L1 scheduling signaling(s) is(are) one-to-one corresponding to the L1 radio signal(s), and each of the L1 scheduling signaling(s) comprises configuration information of a corresponding radio signal; and the multi-antenna related capability under the target transmission configuration is used for determining at least one of a payload size of each of the L1 scheduling signaling(s) or a format of each of the L1 scheduling signaling(s).

5. The method according to claim 1, wherein the multi-antenna related capability comprises a number of layers.

6. A method in a base station for wireless communication, comprising:
    receiving K pieces of first-type information through an air interface, the K being a positive integer greater than 1;
    wherein the K pieces of first-type information indicate multi-antenna related capabilities of a transmitter of the K pieces of first-type information under K transmission configurations; the K transmission configurations all correspond to a first frequency band combination, and the first frequency band combination comprises one or more frequency bands; numbers of parallel carriers corresponding to the K transmission configurations belong to K first-type integer sets respectively, any one of the K first-type integer sets is composed of one or more positive integers, and any two of the K first-type integer sets are different.

7. The method according to claim 6, comprising:
    transmitting a first signaling through the air interface;
    wherein the first signaling is used for determining Q transmission modes, the Q being a positive integer greater than 1; the Q transmission modes are all applied to a first frequency subband set, the first frequency subband set is composed of L carrier(s), the L being a positive integer; numbers of parallel carriers corresponding to the Q transmission modes are Q second-type integer sets respectively; any one of the Q second-type integer sets is composed of one or more positive integers, and any two of the Q second-type integer sets are different; and the K pieces of first-type information are used for determining the Q transmission modes.

8. The method according to claim 6, comprising:
transmitting a second signaling; and
transmitting L1 radio signal(s) in L1 carrier(s) respectively, or receiving L1 radio signal(s) in L1 carrier(s) respectively;
wherein the second signaling indicates L2 carrier(s), the L1 carrier(s) is(are) a subset of the L2 carrier(s), the L2 is a positive integer not less than the L1, the L2 belongs and only belongs to a target first-type integer set among the K first-type integer sets, the target first-type integer set corresponds to a target transmission configuration among the K transmission configurations, and the multi-antenna related capability under the target transmission configuration is used for determining a number of antenna ports transmitting each of the L1 radio signal(s).

9. The method according to claim 8, comprising:
transmitting L1 scheduling signaling(s) through the air interface;
wherein the L1 scheduling signaling(s) is(are) one-to-one corresponding to the L1 radio signal(s), and each of the L1 scheduling signaling(s) comprises configuration information of a corresponding radio signal; and the multi-antenna related capability under the target transmission configuration is used for determining at least one of a payload size of each of the L1 scheduling signaling(s) or a format of each of the L1 scheduling signaling(s).

10. The method according to claim 6, wherein the multi-antenna related capability comprises a number of layers.

11. A User Equipment (UE) for wireless communication, comprising:
a first transmitter, to transmit K pieces of first-type information through an air interface, the K being a positive integer greater than 1;
wherein the K pieces of first-type information indicate multi-antenna related capabilities of the UE under K transmission configurations respectively; the K transmission configurations all correspond to a first frequency band combination, and the first frequency band combination comprises one or more frequency bands; numbers of parallel carriers corresponding to the K transmission configurations belong to K first-type integer sets respectively, any one of the K first-type integer sets is composed of one or more positive integers, and any two of the K first-type integer sets are different.

12. The UE according to claim 11, comprising:
a first receiver, to receive a first signaling through the air interface;
wherein the first signaling is used for determining Q transmission modes, the Q being a positive integer greater than 1; the Q transmission modes are all applied to a first frequency subband set, the first frequency subband set is composed of L carrier(s), the L being a positive integer; numbers of parallel carriers corresponding to the Q transmission modes are Q second-type integer sets respectively; any one of the Q second-type integer sets is composed of one or more positive integers, and any two of the Q second-type integer sets are different; and the K pieces of first-type information are used for determining the Q transmission modes.

13. The UE according to claim 11, wherein
the first receiver further receives a second signaling;
and the UE comprises:
a first processor, to receive L1 radio signal(s) in L1 carrier(s) respectively, or to transmit L1 radio signal(s) in L1 carrier(s) respectively;
wherein the second signaling indicates L2 carrier(s), the L1 carrier(s) is(are) a subset of the L2 carrier(s), the L2 is a positive integer not less than the L1, the L2 belongs and only belongs to a target first-type integer set among the K first-type integer sets, the target first-type integer set corresponds to a target transmission configuration among the K transmission configurations, and the multi-antenna related capability under the target transmission configuration is used for determining a number of antenna ports transmitting each of the L1 radio signal(s).

14. The UE according to claim 11, wherein
the first receiver receives L1 scheduling signaling(s) through the air interface;
wherein the L1 scheduling signaling(s) is(are) one-to-one corresponding to the L1 radio signal(s), and each of the L1 scheduling signaling(s) comprises configuration information of a corresponding radio signal; and the multi-antenna related capability under the target transmission configuration is used for determining at least one of a payload size of each of the L1 scheduling signaling(s) or a format of each of the L1 scheduling signaling(s).

15. The UE according to claim 11, wherein the multi-antenna related capability comprises a number of layers.

16. A base station for wireless communication, comprising:
a second receiver, to receive K pieces of first-type information through an air interface, the K being a positive integer greater than 1;
wherein the K pieces of first-type information indicate multi-antenna related capabilities of a transmitter of the K pieces of first-type information under K transmission configurations; the K transmission configurations all correspond to a first frequency band combination, and the first frequency band combination comprises one or more frequency bands; numbers of parallel carriers corresponding to the K transmission configurations belong to K first-type integer sets respectively, any one of the K first-type integer sets is composed of one or more positive integers, and any two of the K first-type integer sets are different.

17. The base station according to claim 16, comprising:
a second transmitter, to transmit a first signaling through the air interface;
wherein the first signaling is used for determining Q transmission modes, the Q being a positive integer greater than 1; the Q transmission modes are all applied to a first frequency subband set, the first frequency subband set is composed of L carrier(s), the L being a positive integer; numbers of parallel carriers corresponding to the Q transmission modes are Q second-type integer sets respectively; any one of the Q second-type integer sets is composed of one or more positive integers, and any two of the Q second-type integer sets are different; and the K pieces of first-type information are used for determining the Q transmission modes.

18. The base station according to claim 16, wherein
the second transmitter further transmits a second signaling;
and the base station comprises:
a second processor, to transmit L1 radio signal(s) in L1 carrier(s) respectively, or to receive L1 radio signal(s) in L1 carrier(s) respectively;
wherein the second signaling indicates L2 carrier(s), the L1 carrier(s) is(are) a subset of the L2 carrier(s), the L2 is a positive integer not less than the L1, the L2 belongs and only belongs to a target first-type integer set among the K first-type integer sets, the target first-type integer set corresponds to a target transmission configuration among the K transmission configurations, and the multi-antenna related capability under the target transmission configuration is used for determining a number of antenna ports transmitting each of the L1 radio signal(s).

19. The base station according to claim 16, wherein
the second transmitter transmits L1 scheduling signaling(s) through the air interface;
wherein the L1 scheduling signaling(s) is(are) one-to-one corresponding to the L1 radio signal(s), and each of the L1 scheduling signaling(s) comprises configuration information of a corresponding radio signal; and the multi-antenna related capability under the target transmission configuration is used for determining at least one of a payload size of each of the L1 scheduling signaling(s) or a format of each of the L1 scheduling signaling(s).

20. The base station according to claim 16, wherein the multi-antenna related capability comprises a number of layers.

\* \* \* \* \*